United States Patent
Gibbons et al.

(10) Patent No.: US 8,590,310 B2
(45) Date of Patent: Nov. 26, 2013

(54) PASSIVE EQUILIZATION FLOW DIVIDER VALVE

(75) Inventors: Kevin Gibbons, Torrington, CT (US); Gerald P. Dyer, Enfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/431,187

(22) Filed: Mar. 27, 2012

(65) Prior Publication Data

US 2013/0255270 A1  Oct. 3, 2013

(51) Int. Cl.
*F02C 1/00* (2006.01)

(52) U.S. Cl.
USPC .............................................. 60/734

(58) Field of Classification Search
USPC ........................ 60/39.281, 734, 739
See application file for complete search history.

(56) References Cited

U.S. PATENT DOCUMENTS

| | | | |
|---|---|---|---|
| 3,032,986 A * | 5/1962 | Wright | 60/39.281 |
| 3,827,460 A * | 8/1974 | Rimmer | 137/809 |
| 4,027,473 A | 6/1977 | Baker | |
| 4,817,389 A * | 4/1989 | Holladay et al. | 60/739 |
| 4,949,538 A | 8/1990 | Iasillo et al. | |
| 5,321,949 A | 6/1994 | Napoli et al. | |
| 5,329,759 A | 7/1994 | Chan | |
| 5,402,634 A | 4/1995 | Marshall | |
| 5,711,145 A * | 1/1998 | Perkey | 60/39.281 |
| 5,809,771 A * | 9/1998 | Wernberg | 60/39.094 |
| 5,848,525 A | 12/1998 | Spencer | |
| 5,881,550 A * | 3/1999 | Toelle | 60/39.094 |
| 5,916,126 A * | 6/1999 | Szillat et al. | 60/778 |
| 6,092,546 A * | 7/2000 | Lebrun et al. | 137/118.06 |
| 6,484,510 B2 * | 11/2002 | Futa et al. | 60/790 |
| 6,666,015 B2 | 12/2003 | Dyer | |
| 6,857,272 B2 | 2/2005 | Summerfield et al. | |
| 7,137,242 B2 * | 11/2006 | Griffiths | 60/243 |
| 7,836,676 B2 * | 11/2010 | Futa et al. | 60/39.281 |
| 8,122,699 B2 * | 2/2012 | Lawrence et al. | 60/39.094 |
| 2005/0279079 A1 * | 12/2005 | Baryshnikov et al. | 60/39.094 |
| 2008/0271456 A1 * | 11/2008 | Scully et al. | 60/740 |
| 2010/0037612 A1 * | 2/2010 | Futa et al. | 60/734 |
| 2010/0058733 A1 * | 3/2010 | Lawrence et al. | 60/39.094 |
| 2010/0058770 A1 | 3/2010 | Ryan | |
| 2010/0293919 A1 * | 11/2010 | Poisson et al. | 60/39.281 |

* cited by examiner

*Primary Examiner* — Phutthiwat Wongwian
(74) *Attorney, Agent, or Firm* — Kinney & Lange, P.A.

(57) ABSTRACT

A method and system for providing fuel to primary and secondary fuel nozzles in a gas turbine engine fuel system comprises generating a fuel flow and routing primary fuel from the fuel flow to a primary fuel nozzle. Backpressure on the fuel flow is maintained using a valve. The valve is opened at increased fuel flow to route secondary fuel from the fuel flow to a secondary fuel nozzle. The valve is progressively opened under increasing fuel flows to reduce a pressure drop across the valve produced by the secondary fuel.

19 Claims, 5 Drawing Sheets

PASSIVE EQUILIZATION FLOW DIVIDER VALVE

BACKGROUND

The present invention relates generally to fuel systems for gas turbine engines. More particularly, the present invention relates to systems for delivering fuel to nozzles within combustors of the gas turbine engines.

Combustors within gas turbine engines are generally of the annular configuration wherein an inner diameter wall circumscribes the engine centerline and an outer diameter wall circumscribes the inner diameter wall to define a combustion chamber therebetween. A ring-like dome typically connects the walls at their upstream end. Fuel nozzles are provided in the dome to inject fuel into a flow of compressed air flowing through the dome. The fuel is injected through small orifices that atomize the fuel to increase combustion efficiency. The nozzles are distributed within the dome evenly around the circumference of the combustor. Recent advancements in combustor design have incorporated the use of primary and secondary fuel nozzles to better control fuel injection during low flow operating states, such as during ignition, ground idle and flight idle. A few primary nozzles that are used during the low-flow conditions are dispersed around the dome and have small injector orifices. A greater number of secondary nozzles having larger orifices are interspersed between the primary nozzles and are brought into use at higher flow conditions, such as during take-off and cruise. The pressure required to properly atomize the fuel in the primary and secondary nozzles can vary widely due to the difference in orifice size.

The primary nozzles open first when fuel flow is initiated, then the secondary fuel nozzles open as fuel flow increases. The valve maintains a minimum backpressure to the primary nozzles to ensure atomization at low flow conditions. The high atomization pressure required by the primary nozzles therefore requires the valve to have a high opening pressure, thereby introducing a point of high pressure drop at the valve during all operating conditions of the engine when the valve is open. It is, however, undesirable to have such a high pressure drop located within the fuel flow. For example, a high pressure drop within the system increases the working pressure and power of the fuel pump, which introduces heat into the fuel system. The heat is an indication of fuel flow inefficiency and, in any event, must be dealt with or dissipated by the engine fuel management system. There is, therefore, a need for controlling flow to primary and secondary nozzles within gas turbine engine combustors without introducing unnecessary high pressure drops within the system.

SUMMARY

The present invention is directed to a method for providing fuel to primary and secondary fuel nozzles in a gas turbine engine fuel system. The method comprises generating a fuel flow and routing primary fuel from the fuel flow to a primary fuel nozzle. Backpressure on the fuel flow is maintained using a valve. The valve is opened at increased fuel flow to route secondary fuel from the fuel flow to a secondary fuel nozzle. The valve is progressively opened under increasing fuel flows to reduce a pressure drop across the valve produced by the secondary fuel.

The present invention is directed to a fuel system for dividing fuel between primary and secondary nozzles in a gas turbine engine. The fuel system comprises primary fuel nozzles, secondary fuel nozzles, a fuel pump and a flow divider valve. The primary and secondary fuel nozzles are coupled to a combustor in the gas turbine engine. The fuel pump generates a fuel flow. The flow divider valve receives the fuel flow and divides fuel to the primary and secondary fuel nozzles. The flow divider valve comprises a valve housing having an inlet for receiving the fuel flow, a piston disposed within the housing to maintain a backpressure on the fuel flow, means for providing primary fuel to the primary fuel nozzles, and means for providing secondary fuel to the secondary fuel nozzles while progressively decreasing the pressure drop across the means for providing the secondary fuel to the secondary fuel nozzles.

DETAILED DESCRIPTION

Figure 1:
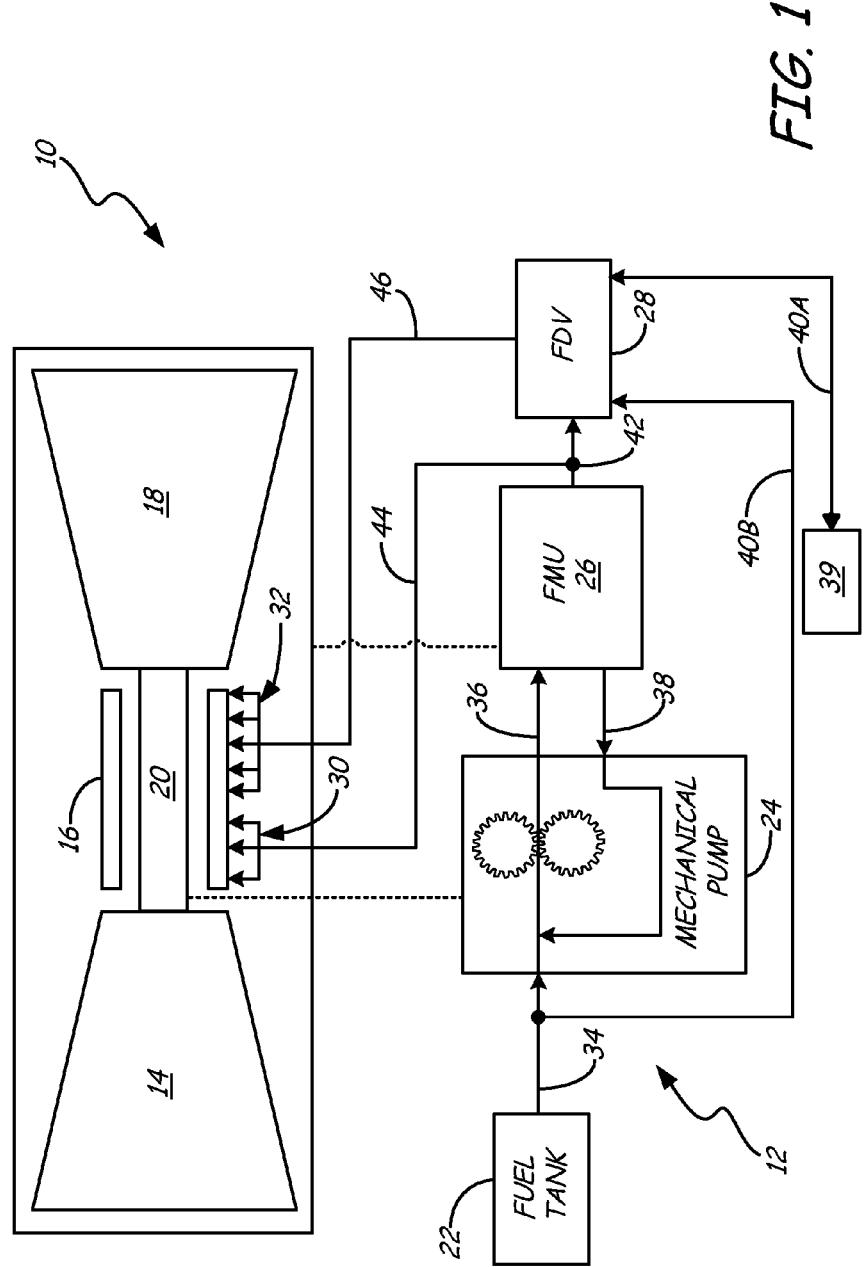
FIG. 1 shows a simplified schematic of a gas turbine engine fuel system that provides continuous flow to primary nozzles and equalizing flow to secondary nozzles using a flow divider valve.

FIG. 1 shows a simplified schematic of gas turbine engine 10 having fuel system 12 in which a flow dividing valve system of the present invention is used. Gas turbine engine 10 includes compressor 14, combustor 16, turbine 18 and shaft 20. Fuel system 12 includes fuel tank 22, fuel pump 24, Fuel Metering Unit (FMU) 26 and flow divider valve 28. Combustor 16 includes primary fuel nozzles 30 and secondary fuel nozzles 32.

FMU 26 comprises an electronic valve module that regulates fuel flow from pump 24 based on sensed needs of engine 10 from, for example, communications with a Full Authority Digital Engine Controller (FADEC) (not shown). Fuel system 12 dispenses fuel from fuel tank 22 to engine 10. Fuel is drawn into pump 24 through fuel line 34 and provided to FMU 26 through fuel line 36. Fuel not needed by FMU 26 is routed back to pump 24 through return line 38. After operation of engine 10 ceases, any remaining fuel in fuel system 12 or combustor 16 is routed to a fuel ecology system 39 via fuel line 40A. Ecology system 39 purges unused fuel from combustor 16 and divider valve 28 to reduce coking and leakage of fuel after shutdown, as is known in the art. FMU 26 is fluidly coupled to divider valve 28 via fuel line 42. Primary nozzles 30 receive fuel directly from FMU 26 through fuel lines 42 and 44. Secondary nozzles 32 receive fuel from divider valve 28 through fuel line 46. Valve 28 can be provided with control pressure through fuel line 40B that connects into an upstream portion of the fuel system, such as fuel line 34.

Compressor 14 intakes and compresses a gas, such as atmospheric air, and forces the compressed gas into combustor 16. Combustor 16 also receives fuel from fuel pump 24 at primary nozzles 30 and secondary nozzles 32. Within combustor 16, the compressed gas and fuel are mixed and ignited to force expanded gas into turbine 18. Turbine 18 extracts energy from the expanded gas to cause rotation of shaft 20 before the gas is expelled from engine 10 as exhaust. Shaft 20, in turn, powers compressor 14 and other subsidiary systems. For example, power from shaft 20 is typically used to turn a tower shaft and gear system for providing input to fuel pump 24 and other accessory systems, such as a generator (not shown).

Fuel pump 24 operates based on the speed of shaft 20 and thus provides an unregulated amount of fuel to FMU 26. FMU 26 receives various engine control signals from various sensors, such as pressure and temperature sensors, within engine 10 to determine various engine needs based on performance demands being placed on engine 10. For example, the amount of fuel needed by engine 10 depends on, among other things, a throttle position actuated by an operator. Engine 10 requires different amounts of fuel under different operating conditions. For example, under start-up conditions, only a low amount of fuel flow is needed by engine 10 as compared to take-off and cruise conditions where a higher amount of fuel flow is required.

FMU 26 meters flow to combustor 14. Primary nozzles 16 are directly connected to the flow of metered fuel, as they are required to receive fuel under all operating conditions of the gas turbine engine. In particular, primary nozzles receive fuel under low-flow conditions, such as start-up. In the embodiment shown, fuel line 44 extends directly between fuel line 42 and nozzles 30, as is discussed with reference to FIG. 3. Fuel line 44 may, however, extend from valve 28 to connect to nozzles 30, as is discussed with reference to FIGS. 4 and 5. Primary nozzles 30 receive a relatively small fraction of the fuel flow from line 42. The remainder of the flow passes thru flow divider valve 28 and to secondary nozzles 32. Flow divider valve 28 is configured to open at a particular backpressure within line 42 to maintain pressurization for atomizing fuel at primary nozzles 30 at low-flow conditions. Flow divider valve 28 provides an equalizing flow of fuel to secondary nozzles 32. Flow divider valve 28 of the present invention allows secondary nozzles 32 to be passively brought into flow communication with combustor 16 as gas turbine engine 10 transitions from low-flow operating conditions to high-flow operating conditions, such as during cruise or flight maneuvers. Valve 28 operates based on fuel pressure and flow rate and is not actively controlled. Furthermore, at high fuel flow rates, valve 28 of the present invention operates to reduce the high backpressure it produces at low fuel flow rates to improve efficiency of fuel system 12.

Primary nozzles 30 are configured with small atomization orifices to provide optimal combustion conditions for start-up with a low amount of fuel. Primary nozzles 30 therefore require a large backpressure in fuel line 44 to properly operate. Secondary nozzles 32 are configured with larger atomization orifices to permit larger volumes of fuel flow such as at cruise conditions. As such, secondary nozzles do not require as large of backpressure within fuel line 46. Flow divider valve 28 maintains backpressure within fuel line 44 at low-flow conditions, but opens under high-flow conditions to increase the size of its flow restriction and reduce the pressure drop it produces. Adequate backpressures are maintained in fuel lines 44 and 46 at high flow conditions due to the inherent static fuel pressures at such elevated flow rates.

Figure 2:
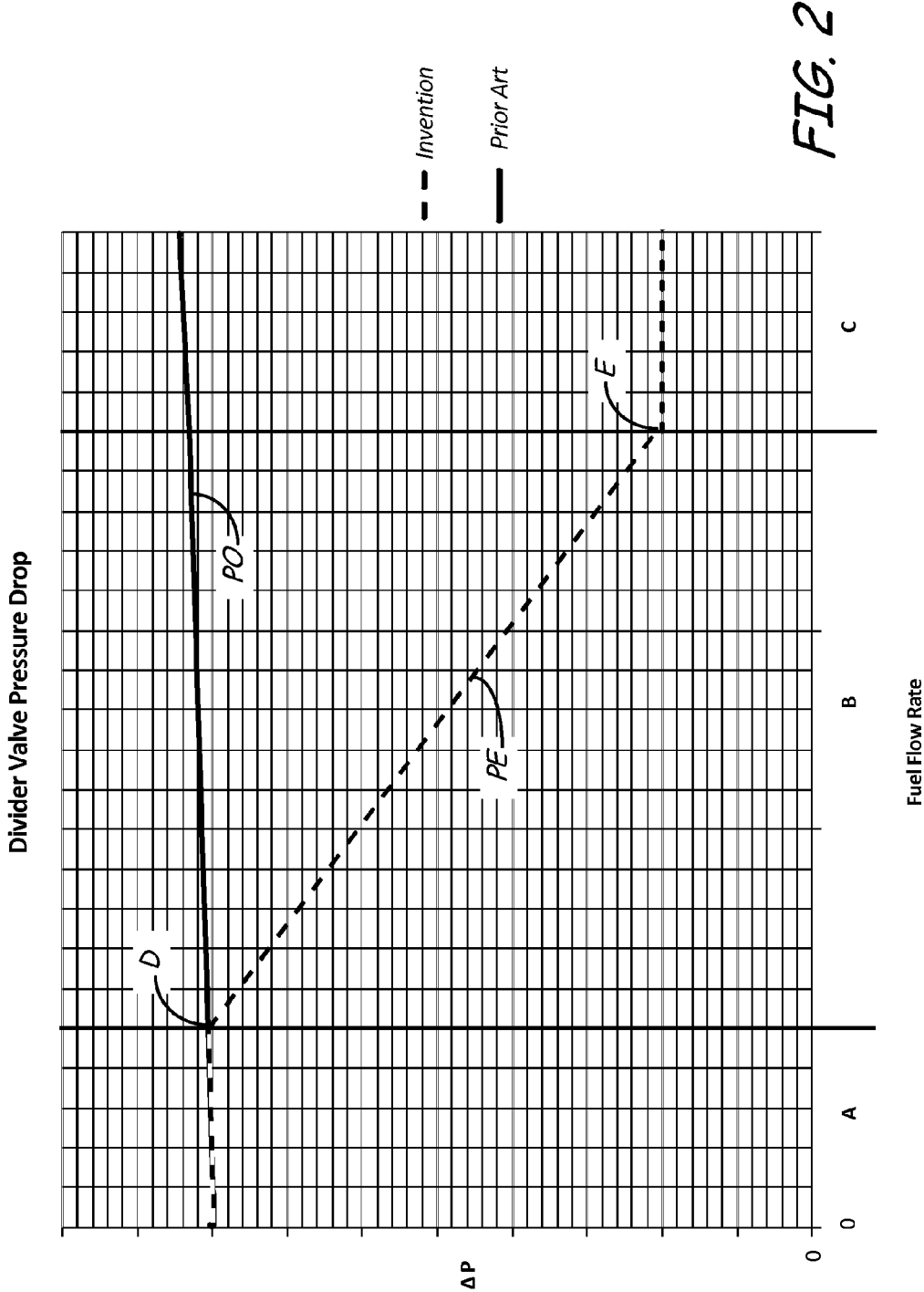
FIG. 2 shows a graph depicting pressure drop in a flow divider valve versus fuel flow for conventional divider valves and passive equalization divider valves of the present invention.

FIG. 2 shows a graph depicting pressure drop in a flow divider valve versus fuel flow for prior art divider valves and passive equalization divider valves of the present invention. The x-axis indicates fuel flow in a gas turbine engine, indicating zero flow at the y-axis, start or ground/flight idle conditions within zone A, equalization in zone B, and takeoff and cruise within zone C. The y-axis indicates pressure drop, $\Delta P$, across the divider valve, increasing from zero to pressures above what is required to operate a typical flow divider valve. Pressure drop for conventional, non-equalizing divider valves is shown by solid line P0. Pressure drop for the passive equalization divider valves of the present invention is shown by dashed line PE.

During low flow conditions, fuel flow increases until the back pressure in the fuel system (fuel line 44) reaches point D, beyond which point the pressure drop of a conventional divider valve would continue to increase along solid line P0. However, as mentioned, continuously having to overcome the pressure drop produced by the flow divider valve after the primary nozzles have been primed at point D is inefficient. During high flow conditions the static fuel pressure is sufficient such that the need for a restriction with a large pressure drop to maintain backpressure is not needed. For example, the restriction increases the operating burden of fuel pump 24 and the rest of the thermal management system of engine 10.

Passive equalization divider valves 28 of the present invention operate in a two-stage manner to 1) provide adequate backpressure during low-flow conditions to prime primary nozzles 30, and 2) to reduce the pressure drop signature produced by the divider valve during high-flow conditions when fuel pressure is adequate to maintain pressurization of primary nozzles 30, while providing fuel to secondary nozzles 32. As shown in FIG. 2, during start-up and ground/flight idle conditions in zone A, the passive equalization divider valves of the present invention permit backpressure in line 44 to build to a particular $\Delta P$ at point D, as do conventional divider valves. At point D, passive equalization divider valve 28 continue to open to permit increasing fuel flow into secondary nozzles 32. However, rather than merely opening and then continuously being maintained open by fuel flow at the same $\Delta P$, the passive equalization divider valves are configured to reduce the total pressure drop across the valve as the fuel flow rate increases. As shown in FIG. 2, $\Delta P$ drops linearly with respect to fuel flow in zone B. In other embodiments, $\Delta P$ may be configured to drop at faster or slower rates at different points of the fuel flow rate (i.e. the fuel flow rate can be non-linear in zone B). At point E, $\Delta P$ across passive equalization divider valve 28 levels off to reduce the workload of pump 24 under high-flow conditions.

Figure 3:
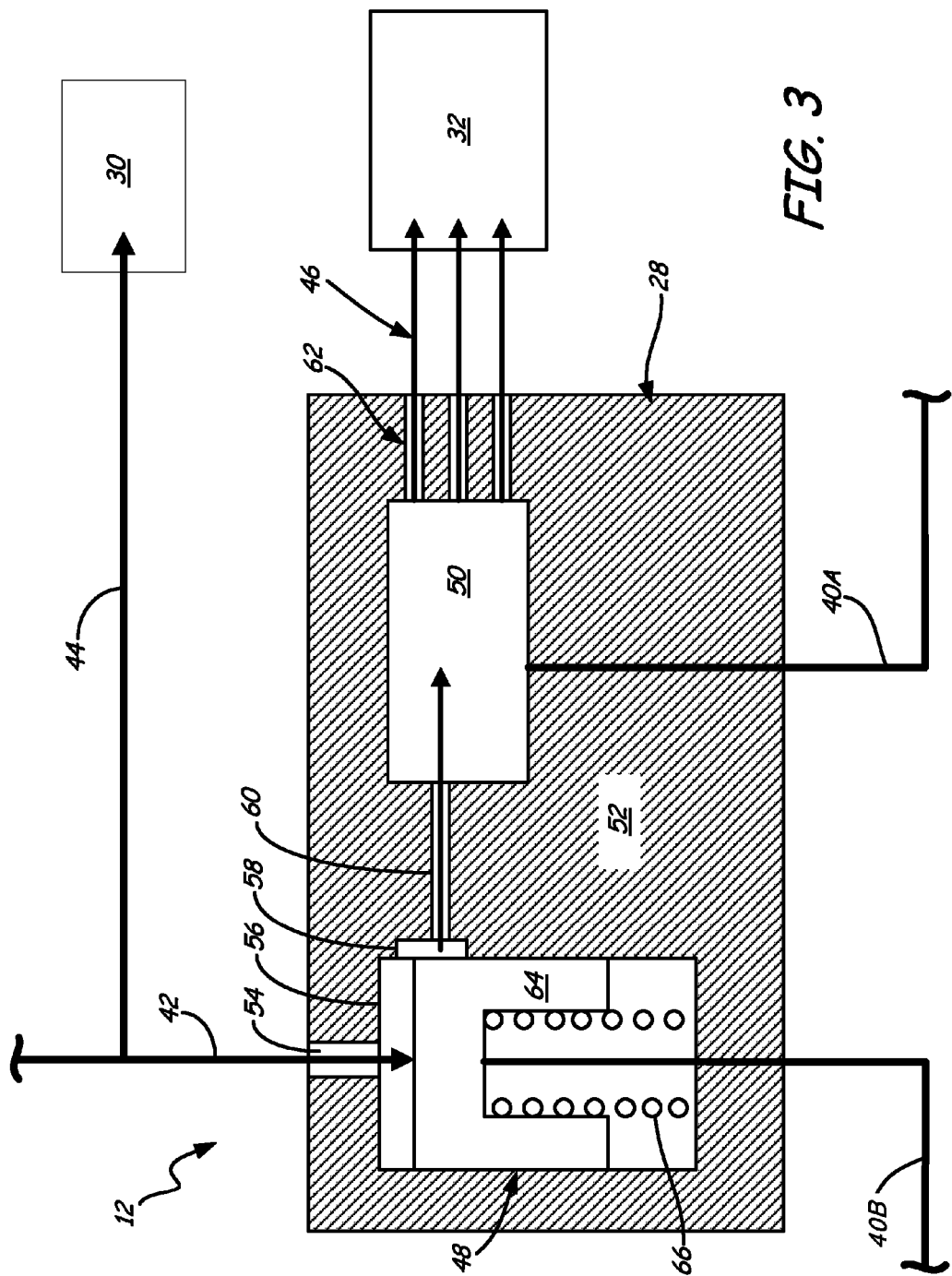
FIG. 3 shows a schematic of a portion of the fuel system of FIG. 1 in which the passive equalization divider valve of the present invention comprises a series-flow, dual-valve system.

FIG. 3 shows a schematic of a portion of fuel system 12 in which passive equalization divider valve 28 of the present invention comprises a series-flow, dual-valve system having primary pressurization valve 48 and flow divider valve 50. Valves 48 and 50 are integrated into housing 52, which includes inlet 54, piston cylinder 56, window 58, feed 60 and outlets 62. Primary pressurization valve 48 includes piston 64 and spring 66. Flow divider valve 50 comprises a divider valve of conventional design. Primary valve 48 is provided with control pressure through line 40B, which is connected to fuel line 34. Flow divider valve 50 is provided with a drain outlet at line 40A.

During operation of engine 10, fuel flows into inlet 54 of housing 52 from fuel line 42 (FIG. 1). During start-up conditions, the fuel pressure is low so that valve 48 does not open. Fuel pressure from line 40B balances static fuel pressure from inlet 54. In other embodiments, line 40B may be connected to another low pressure point within fuel system 12, such as fuel line 38. Thus, the spring force of spring 66 biases piston 64 against inlet 62 thereby preventing fuel flow to window 58. Fuel, however, continues to flow from line 42 into line 44 and on to primary nozzles 30. As the start-up of engine 10 continues, backpressure builds within line 44 allowing fuel to be atomized at nozzles 30. At a threshold pressure, the magnitude of which is sufficient to atomize the fuel at nozzles 30, primary valve 48 begins to open due to increased fuel flow rates, which overcomes the force applied by spring 66. Piston 64 retreats within piston cylinder 56 to uncover window 58, permitting fuel to leak into feed 60. This occurs within region A in FIG. 2. Divider valve 50 operates in a conventional manner to split the fuel flow into multiple paths at outlets 62 for feeding each secondary nozzle 32 individually or for feeding zones of injectors, such as with a manifold or manifolds. The pressure required to open valve 50 is much lower than the pressure required to open valve 48, as provided by spring 66. As fuel pressure continues to increase as engine 10 moves through equalization (zone B of FIG. 2), piston 64 retreats to fully uncover window 58. At such point the pressure drop produced by primary valve 48 becomes negligible, leaving only the pressure drop produced by equalizing valve 50. This occurs at point E in FIG. 2. As such, overall pressure drop in valve 28 is lowered from that provided by valve 48 to that provided by valve 50, thereby lowering the work needed to be done by pump 24 (FIG. 1). Divider valve 50 is provided with a drain outlet at line 40A, which is connected to ecology system 39 (FIG. 1) to permit unused fuel remaining in valve 50 to be removed from the fuel system.

Figure 4:
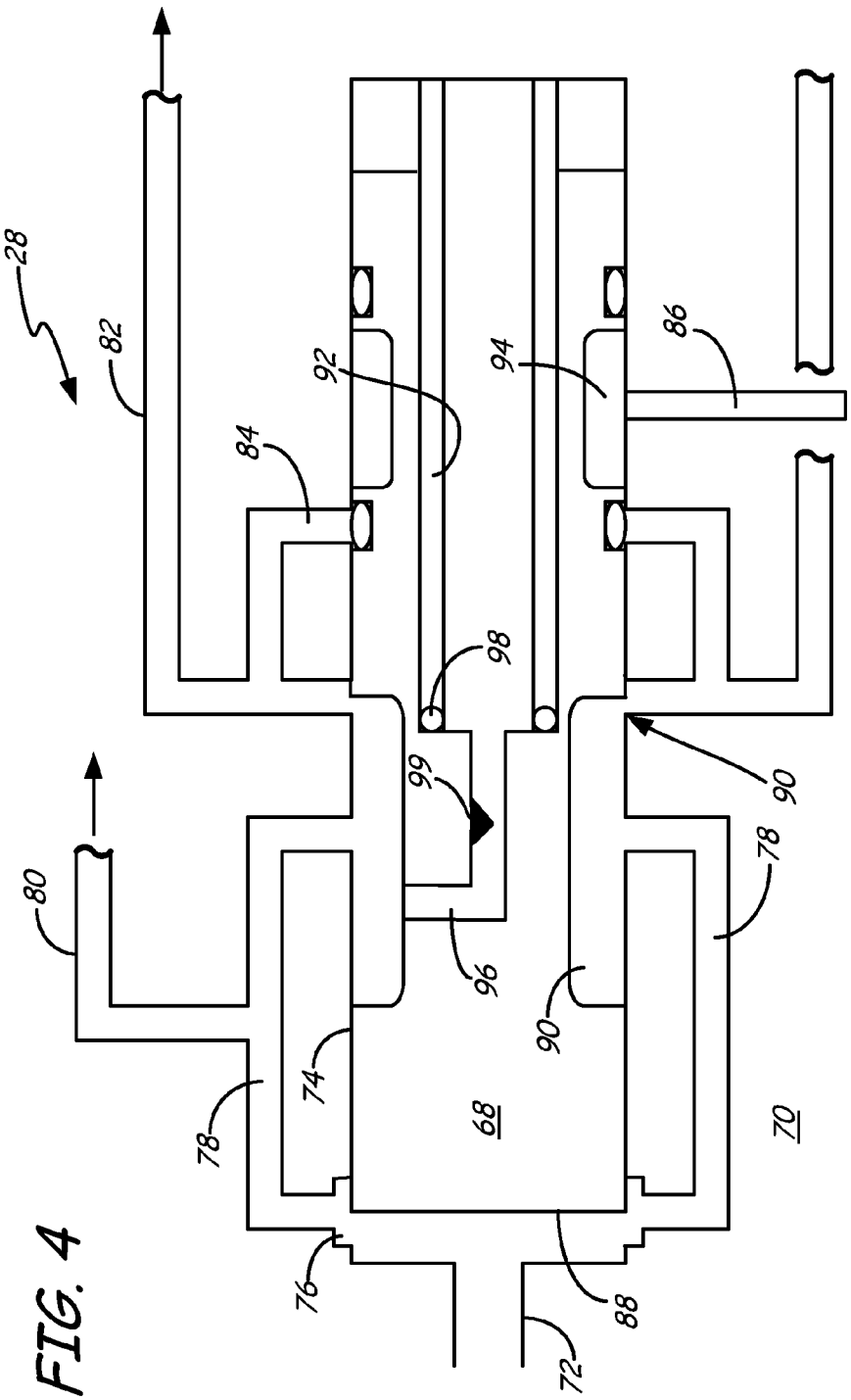
FIG. 4 shows a schematic of a portion of the fuel system of FIG. 1 in which the passive equalization divider valve of the present invention comprises a double-action, linear piston valve.

FIG. 4 shows a schematic of a portion of fuel system 12 in which passive equalization divider valve 28 of the present invention comprises a double-action, linear piston valve having piston 68 disposed within housing 70. Housing 70 includes inlet 72, piston cylinder 74, window 76, cross-port 78, primary outlet 80, secondary outlets 82, drain line 84 and drain 86. Piston 68 includes actuation face 88, equalization port 90, spring pocket 92, drain port 94, balance port 96, spring 98 and orifice 99.

During operation of engine 10, fuel flows into inlet 72 of housing 70 from fuel line 42 (FIG. 1). Fuel also flows into balance port 96 and into spring pocket 92 to allow static fuel pressure to maintain a force balance on piston 68. The force of the motive flow of fuel, however, acts against piston face 88 to counteract spring force from spring 98 to open valve 28. During start-up and ground/flight idle conditions, with low fuel flow, piston 68 moves to uncover window 76 and partially uncover window 90. Window 76 is contoured to maintain a minimum pressure drop and to produce a linear valve position versus fuel flow relationship. Fuel flows through window 76, into cross-port 78 and out to primary outlet 80. Thus, fuel is provided to primary nozzles 30 (FIG. 1). Flow above that going to primary nozzles 30 passes thru equalization port 90 to outlets 82 to secondary nozzles 32. The pressure drop across window 90 maintains a backpressure within line 78 such that fuel provided to the primary nozzles through outlet 80 is sufficiently atomized.

Under mid to high flow conditions, piston 68 moves further to the right (with reference to FIG. 4), continuing to open equalization port 90. Equalization port 90 is shaped such that, as it continues to open, the pressure drop across it decreases to being negligible compared to the pressure drop produced by window 76. This is low enough to not produce undue burden on pump 24 and the thermal management system of engine 10.

Housing 70 is also connected to fuel line 40A (FIG. 1) to permit fuel to drain from valve 28 when engine 10 is shut down. Specifically, drain lines 84 are fluidly coupled with secondary outlets 82 to permit fuel to drain back to ecology system 39 through fuel line 40A. Drain lines 84 are fluidly coupled to drain 86 via drain port 94 when piston 68 is fully closed, or all the way to the left with reference to FIG. 4.

Figure 5:
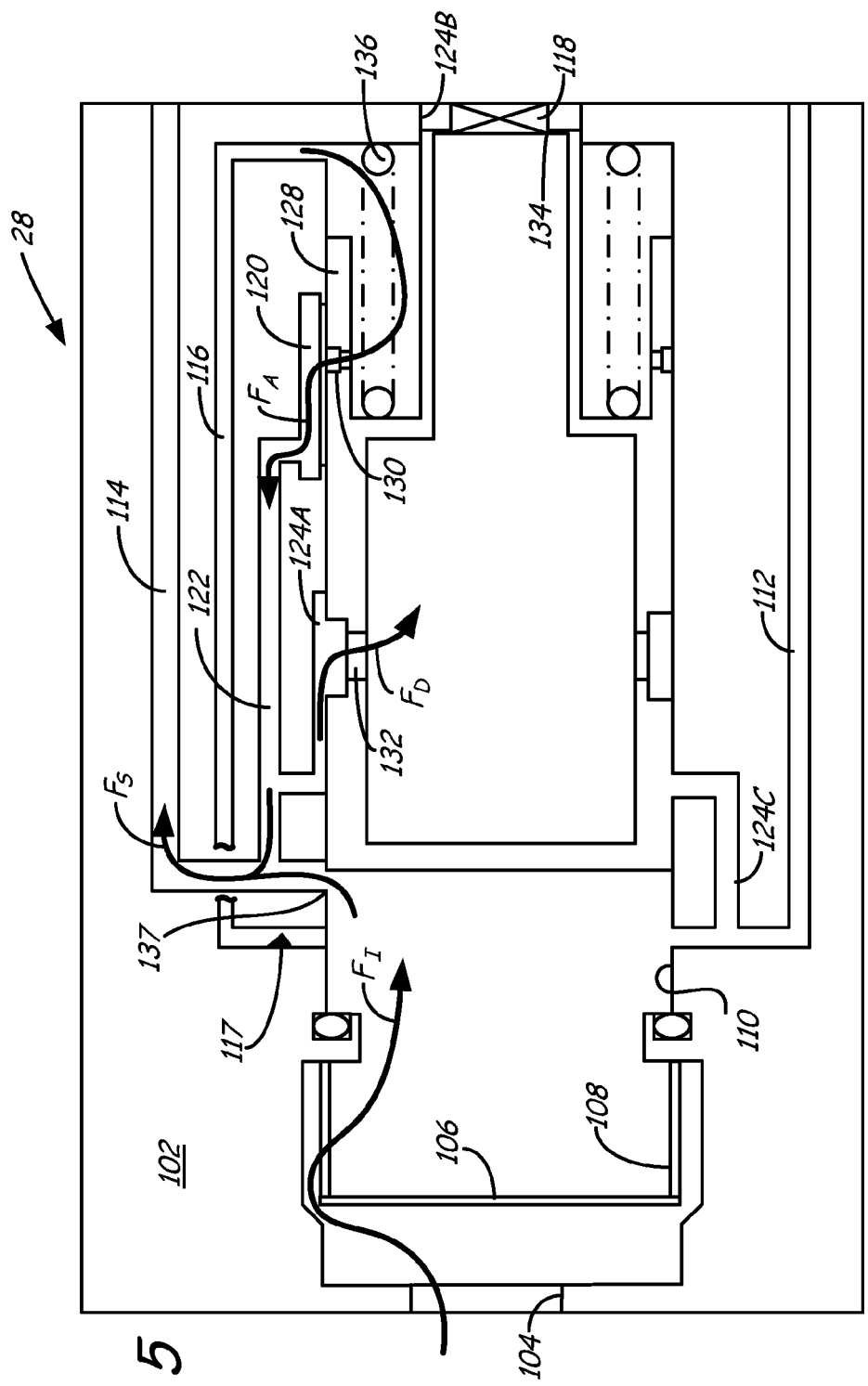
FIG. 5 shows a schematic of a portion of the fuel system of FIG. 1 in which the passive equalization divider valve of the present invention comprises a double-action, parallel-flow piston valve.

FIG. 5 shows a schematic of a portion of fuel system 12 in which the passive equalization divider valve 28 of the present invention comprises a double-action, parallel-flow piston valve having piston 100 disposed within housing 102. Housing 102 includes inlet 104, barrier 106, screen 108, piston cylinder 110, primary outlet 112, secondary outlet 114, control passage 116, fixed orifice 117, drain valve 118, window 120, control outlet 122 and drain passages 124A, 124B and 124C. Piston 100 includes actuation face 126, actuation flange 128, orifice 130, drain window 132, drain window 134 and spring 136.

During operation of engine 10, fuel flows into inlet 72 of housing 70 from fuel line 42 (FIG. 1). Inlet fuel $F_I$ contacts barrier 106 and is pushed outward into screen 108 to remove particulates from the fuel flow. Inlet fuel $F_I$ then engages actuation face 126 and pushes piston 100 to the right (with reference to FIG. 5). Initially, during start-up conditions, the fuel flow is low so that piston 100 uncovers primary outlet 112, so that most of the fuel can flow out to primary nozzles 30 (FIG. 1). A small portion of the fuel flows into line 115 as actuation fuel $F_A$. At fuel flows above start-up, window 137 opens to flow to secondary nozzles 32 via line 114.

Actuation fuel $F_A$ within passage 116 travels to the inside of piston cylinder 110 behind piston 100 and within actuation flange 128. From piston cylinder 110, actuation fuel $F_A$ travels through orifice 130 and window 120 and into control outlet 122. Window 120 is contoured to provide a smaller restriction with a larger pressure drop at low flow rates (when piston 100 is toward the left in FIG. 5) and to provide a larger restriction with a smaller pressure drop at high flow rates (when piston 100 is toward the right in FIG. 5). Window 137 realizes the total pressure drop in valve 28, including that of orifice 117 plus window 120. This same total pressure drop is realized by primary nozzles 30. Thus, primary nozzles 30 see sufficient pressure at low flows for proper fuel atomization.

Movement of piston 100 is dictated by the pressure across orifice 117. Initially, the summation of the pressure drops in orifice 117 and window 120 provides a backpressure so that low fuel flow will be forced into primary outlet 112. At low fuel flows, window 120 provides a large pressure drop that limits flow into passage 116. As increased fuel flow continues to stroke piston 100, window 120 opens to increase its restriction size and to reduce backpressure downstream of orifice 117. Thus, more actuation fuel $F_A$ is permitted to flow into control passage 116. As piston 100 continues to stroke open, secondary fuel $F_S$ increases thru secondary outlet 114, where it is joined by actuation fuel $F_A$ for distribution to secondary nozzles 32 (FIG. 1). Actuation fuel $F_A$ ultimately joins with secondary outlet 114 for distribution to secondary nozzles 32. Housing 102 can be provided with a plurality of secondary outlets 114 for distributing fuel to a plurality of secondary nozzles or secondary manifolds. However, only one of the secondary outlets 114 need be provided with control passage 116, fixed orifice 117 and window 120 to control the position of piston 100.

Housing 102 and piston 100 also include drain lines and windows to permit fuel to drain from valve 28 at shut-down of engine 10. Specifically, drain fuel $F_D$ is permitted into the interior of piston 100 through drain line 124A, which engages drain window 132 across the entire stroke length of piston 100. When piston 100 retreats under lack of fuel pressure drain window 132 engages drain line 124C to let fuel drain out to primary nozzles 30. Additionally, with piston 100 retracted, drain valve 118 can be configured to open to allow fuel to leave valve housing 102 at drain line 124B, which connects to fuel line 39 through fuel line 40A (FIG. 1).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fuel system for dividing fuel between primary and secondary nozzles in a gas turbine engine, the fuel system comprising:
   primary and secondary fuel nozzles coupled to a combustor in the gas turbine engine;
   a fuel pump that generates a fuel flow;
   a first flow divider valve that receives the fuel flow and divides fuel to the primary and secondary fuel nozzles, the first flow divider valve comprising:
      a valve housing having an inlet for receiving the fuel flow;
      means for providing primary fuel to the primary fuel nozzles comprising a spring-actuated piston valve disposed within the valve housing to maintain a backpressure in the fuel flow that routes the primary fuel through a first fuel line extending between the inlet and the primary nozzles; and
      means for providing secondary fuel to the secondary fuel nozzles while progressively decreasing the pressure drop across the means for providing the secondary fuel to the secondary fuel nozzles, the means for providing secondary fuel to the secondary fuel nozzles comprises:
         a window in the valve housing disposed along the piston to route the secondary fuel through a second fuel line; and
         a second flow divider valve disposed within the valve housing and coupled to the second fuel line and a plurality of outlets fluidly coupled to the secondary nozzles.

2. The fuel system of claim 1 wherein the means for providing secondary fuel to the secondary fuel nozzles is configured such that pressure drop across the means for providing the secondary fuel to the secondary fuel nozzles is negligible when the spring-actuated valve is fully open.

3. The fuel system of claim 1 and further comprising means for routing fuel flow to a cavity behind the piston.

4. The fuel system of claim 3 wherein the means for routing fuel flow to the cavity behind the piston comprises:
   a fuel passage extending through the piston.

5. The fuel system of claim 3 wherein the means for routing fuel flow to the behind the piston comprises:
   a fuel line connecting the fuel flow to the cavity behind the piston.

6. The fuel system of claim 1 and further comprising:
   a fuel tank from which the fuel pump receives fuel; and
   a fuel metering unit disposed between the fuel pump and the flow divider valve to deliver a metered flow of fuel to the flow divider valve and to return unused fuel to a fuel ecology system.

7. The fuel system of claim 6 and further comprising a drain line for connecting the means for providing secondary fuel to the fuel ecology system.

8. A fuel system for dividing fuel between primary and secondary nozzles in a gas turbine engine, the fuel system comprising:
   primary and secondary fuel nozzles coupled to a combustor in the gas turbine engine;
   a fuel pump that generates a fuel flow;
   a flow divider valve that receives the fuel flow and divides fuel to the primary and secondary fuel nozzles, the flow divider valve comprising:
      a valve housing having an inlet for receiving the fuel flow;
      a piston disposed within the housing to maintain a backpressure on the fuel flow;
      means for providing primary fuel to the primary fuel nozzles comprising:
         a spring-actuated valve that maintains a back pressure in the fuel flow; and
         a window in the housing fluidly coupled to a first fluid line extending to the primary nozzles, wherein the window is contoured to achieve a linear relationship between valve position and primary fuel flow;
      means for providing secondary fuel to the secondary fuel nozzles while progressively decreasing the pressure drop across the means for providing the secondary fuel to the secondary fuel nozzles, the means for providing secondary fuel to the secondary fuel nozzles comprises:
         a slot on the piston that is in fluid communication with the first fuel line and a second fuel line in communication with the secondary fuel nozzles, wherein the slot is contoured to permit a first secondary fuel flow rate over a first length of the slot and a second secondary fuel flow rate over a second length of the slot.

9. The fuel system of claim 8 and further comprising means for routing fuel flow to a cavity behind the piston.

10. The fuel system of claim 9 wherein the means for routing fuel flow to the cavity behind the piston comprises:
    a fuel passage extending through the piston.

11. The fuel system of claim 9 wherein the means for routing fuel flow to the behind the piston comprises:
    a fuel line connecting the fuel flow to the cavity behind the piston.

12. The fuel system of claim 8 and further comprising:
    a fuel tank from which the fuel pump receives fuel; and
    a fuel metering unit disposed between the fuel pump and the flow divider valve to deliver a metered flow of fuel to the flow divider valve and to return unused fuel to a fuel ecology system.

13. The fuel system of claim 12 and further comprising a drain line for connecting the means for providing secondary fuel to the fuel ecology system.

14. A fuel system for dividing fuel between primary and secondary nozzles in a gas turbine engine, the fuel system comprising:
    primary and secondary fuel nozzles coupled to a combustor in the gas turbine engine;
    a fuel pump that generates a fuel flow;
    a flow divider valve that receives the fuel flow and divides fuel to the primary and secondary fuel nozzles, the flow divider valve comprising:
       a valve housing having an inlet for receiving the fuel flow;
       a piston disposed within the housing to maintain a backpressure on the fuel flow;
       means for providing primary fuel to the primary fuel nozzles comprising:

a spring-actuated valve that maintains a back pressure in the fuel flow; and a first window in the housing coupled to a first fuel line extending from the valve housing to the primary nozzles; and means for providing secondary fuel to the secondary fuel nozzles while progressively decreasing the pressure drop across the means for providing the secondary fuel to the secondary fuel nozzles, wherein the means for providing secondary fuel to the secondary fuel nozzles comprises:

a second window in the housing coupled to a second fuel line extending from the valve housing to the secondary nozzles;

a third window in the housing positioned between the first and second windows, the third window coupled to a third fuel line extending to a cavity behind the spring-actuated piston;

a fixed orifice positioned on the piston to receive fuel from the cavity;

a fourth fuel line extending from the cavity to the second fuel line; and a variable orifice positioned between the orifice and the fourth fuel line.

15. The fuel system of claim 14 and further comprising means for routing fuel flow to a cavity behind the piston.

16. The fuel system of claim 15 wherein the means for routing fuel flow to the cavity behind the piston comprises:

a fuel passage extending through the piston.

17. The fuel system of claim 15 wherein the means for routing fuel flow to the behind the piston comprises:

a fuel line connecting the fuel flow to the cavity behind the piston.

18. The fuel system of claim 14 and further comprising:

a fuel tank from which the fuel pump receives fuel; and a fuel metering unit disposed between the fuel pump and the flow divider valve to deliver a metered flow of fuel to the flow divider valve and to return unused fuel to a fuel ecology system.

19. The fuel system of claim 18 and further comprising a drain line for connecting the means for providing secondary fuel to the fuel ecology system.

* * * * *